United States Patent [19]

Etess

[11] Patent Number: 4,920,785

[45] Date of Patent: May 1, 1990

[54] HERMETICITY TESTING METHOD AND SYSTEM

[75] Inventor: Edward Etess, La Jolla, Calif.

[73] Assignee: Web Technology, Inc., Dallas, Tex.

[21] Appl. No.: 623,009

[22] Filed: Jun. 21, 1984

[51] Int. Cl.$^5$ .............................................. G01M 3/20
[52] U.S. Cl. ..................................... 73/40.7; 73/49.3
[58] Field of Search ................. 73/40, 37, 40.7, 49.3

[56] References Cited

U.S. PATENT DOCUMENTS

| | | | |
|---|---|---|---|
| 3,091,114 | 5/1963 | Webster | 73/49 |
| 3,416,359 | 12/1968 | Durbin et al. | 73/40 |
| 3,479,862 | 3/1967 | Trapp et al. | 73/49 |
| 3,548,636 | 9/1968 | Litant | 73/40 |
| 3,591,944 | 7/1971 | Wilcox | 73/49.3 X |
| 3,672,207 | 6/1972 | Cramp et al. | 73/40.7 |
| 3,675,468 | 7/1972 | Caccamese et al. | 73/40 |
| 3,729,983 | 5/1973 | Coppens | 73/40.7 |
| 3,738,158 | 6/1973 | Farrell et al. | 73/40 |
| 3,762,212 | 10/1983 | Morley et al. | 73/40.7 |
| 3,902,068 | 8/1975 | Wood | 73/49.3 |
| 4,158,960 | 6/1979 | White et al. | 73/40 |
| 4,282,744 | 8/1981 | Dick | 73/49 |

FOREIGN PATENT DOCUMENTS 79442 5/1982 Japan ..................... 73/40.7

OTHER PUBLICATIONS

MIL-STD-883C, 25 Aug. 1983, Method 1014.5, Method 1014.6 (Seal).
"Leak Detection of Hermetically Sealed Devices", Jim Anthony, InterTest Corporation, Automatic Testing-/Ate, *Test & Measurement Work*, /Jan. 1985.
Pages 1–3 and 13–16 taken from descriptive literation of Trio-Tech International of Burbank, California, these pages appearing as if they might come from an annular report of the corporation.
Varian Publication entitled "New Dimensions in Leak Detection".

*Primary Examiner*—Hezron E. Williams
*Attorney, Agent, or Firm*—Oblon, Spivak, McClelland, Maier & Neustadt

[57] ABSTRACT

A method for testing the hermeticity of a sealed cavity within a microelectronic, semiconductor, or other electronic component package includes pressure bombing the package within a detector-fluid bath, attempting thereby to introduce liquid detector fluid into the cavity through any leaks. A detector fluid is used whose vapor state possesses a distinctive physical characteristic that is detectable with known instrumentation. The package is then removed from the bath to permit a quantity of any detector fluid introduced into the cavity to vaporize and evolve for detection. Heating and vibrating the package may be employed to accelerate detector fluid outgassing, together with vacuum withdrawal of the vapor, and detection may employ measurement of infrared absorption. A system for detecting evolving detector fluid vapor includes both a test cell with which to confine the vapor and the instrumentation for measuring infrared absorption of test cell contents. The volume of the test cell is proportioned to the cavity size to inhibit dilution of evolving detector-fluid vapor beyond the detection capabilities of the instrumentation employed.

15 Claims, 2 Drawing Sheets

HERMETICITY TESTING METHOD AND SYSTEM

FIELD OF THE INVENTION

This invention relates in general to a method and a system for testing the hermeticity of a sealed cavity within an electronic package.

BACKGROUND OF THE INVENTION

Microelectronic, semiconductor, and other electronic components are often sealed in a cavity within protective packaging material, with lead wires extending from the circuitry to the exterior of the protective package for connection to other components. The protective package is intended to hold the circuitry in place and protect it against corrosion, oxidation, shock, handling, temperature, and other problems that can result in failure.

Although a number of different materials including plastic can be used, high-reliability devices often employ ceramic packaging. The ceramic packaging can provide a hermetic (air-tight) seal and superior heat dissipation. However, leaks, breaks, and other defects in the ceramic or other packaging may develop during manufacturing that affect the hermeticity of the seal and thereby threaten contamination and eventual malfunction of the circuitry within.

Many manufacturers and purchasers of high-reliability packages follow military defined specifications that prescribe hermeticity testing which includes gross leak testing and fine leak testing. Gross leaks are generally defined in the specifications as defects leaking at a rate of one-one hundred thousandth of a cubic centimeter ($10^{-5}$ cc) per second or more, and fine leaks are generally defined as defects leaking at a rate as small as one-one hundred billionth of a cubic centimeter ($10^{-11}$) per second. Problems unique to each leak rate dictate different testing methods for each.

Recognized test for gross leaks include the "weight gain method" and the "bubble method". Both methods involve holding the package under vacuum for approximately one hour and then attempting to backfill the cavity under pressure within an inert fluorocarbon bath, followed by removing the package from the bath, waiting a required amount of time for liquid on the exterior of the package to evaporate, and finally determining whether any fluorocarbon liquid was introduced into the cavity through a leak.

Under the weight gain method, the package is weighed before and after attempted backfilling, a change in weight being indicative of a leak.

Under the bubble method, the package is immersed in a liquid bath having a temperature above the boiling point of the liquid fluid introduced into the cavity which in turn causes detector-fluid vapor to evolve from the cavity ("outgassing"), bubbles rising from the package being indicative of a leak.

Both methods serve to determine whether fluorocarbon liquid was introduced into the cavity through a leak, but both require the time and careful attention of a trained operator. These methods are slow, costly, dependent upon human attention and judgment, and especially susceptible to operator error.

Therefore, it is desirable to have a superior method of gross leak detection in electronic packages.

It is particularly desirable to have a better method to detect outgassing of any detector-fluid vapor during hermeticity testing.

It is further desirable to avoid dependence on human attention and judgment and to have a reproducible and cost effective test suitable for quality control.

It is also desirable that the improved method be readily adaptable to automation.

And, it is desirable to avoid the cost and inconvenience of the large quantities of fluorocarbon fluid typically used in production testing by the bubble method.

SUMMARY OF THE INVENTION

This invention provides a new and improved method for testing the hermeticity of a sealed cavity within an electronic package.

An exemplary procedure according to the invention includes pressure bombing a package within a detector-fluid bath using known means of attempting to backfill the package under pressure with liquid detector fluid after first holding the package under vacuum. A detector fluid is used that has a liquid state with low surface tension and volatility as well as a vapor state with a distinctive physical characteristic that can be subsequently detected with known instrumentation.

The package is removed from the bath to permit a quantity of any detector fluid introduced into the cavity to vaporize and evolve from the cavity. The package may be heated and/or vibrated to accelerate detector-fluid outgassing.

Evolving detector-fluid vapor is detected through the distinctive physical characteristic of the detector fluid employed, such as by measuring infrared absorption of a detector-fluid vapor with recognizable infrared absorption characteristics.

Detection may proceed with a system constructed according to the invention that includes a test cell with which to confine evolving detector fluid vapor, the volume of the test cell being proportioned to the size of the cavity to limit dilution of evolving detector fluid vapor.

Other features and many attendant advantages of the invention will become more fully apparent upon a reading of the detailed description in conjunction with the drawings wherein like numerals refer to like components throughout.

DETAILED DESCRIPTION

Figure 1:
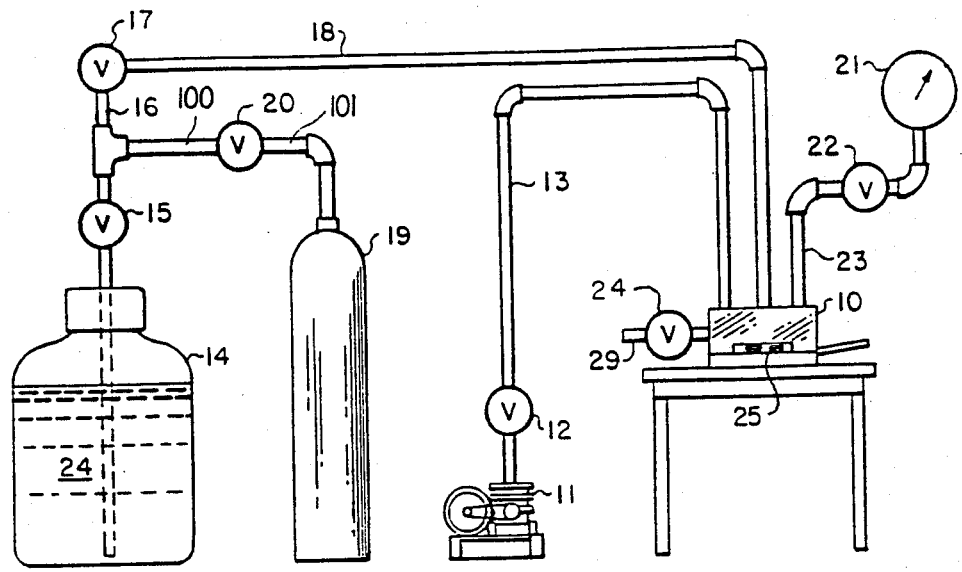
FIG. 1 is a side elevation view of apparatus for pressure bombing a package.
Figure 3:
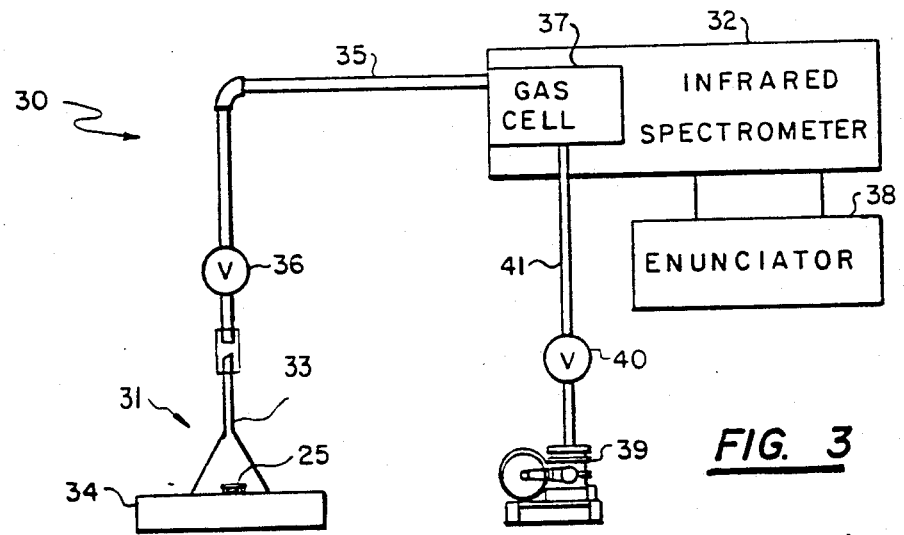
FIG. 3 is a side elevation view of an exemplary embodiment of a system for detecting evolving detector-fluid vapor according to the invention.
Figure 2:
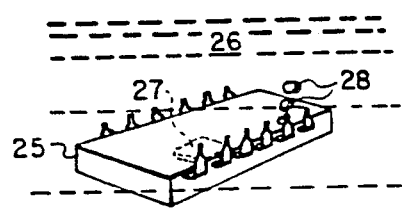
FIG. 2 is a pictorial representation of a typical package and the bubble method of vapor detection used in the prior art.

A method and system for testing the hermeticity of a sealed cavity within a microelectronic, semiconductor, or other electronic component package is illustrated in FIGS. 1-3. FIG. 1 illustrates apparatus for pressure bombing an electronic package within a detector-fluid bath. According to the method of the invention, a vacuum/pressure cell, cell 10 in FIG. 1, is employed for pressure bombing a package using known means of attempting to backfill the package under pressure with liquid detector fluid after first holding the package under vacuum.

A cavity containing package to be tested, package 25 in FIG. 1, is shown in place in the cell 10 to illustrate this aspect. It may be a conventional dual-in-line package (DIP) comprising a circuit chip encased in a ceramic material. A vacuum source, vacuum pump 11; is coupled through a valve 12 and a line 13 to the cell 10. The vacuum source is used to evacuate the test cell during the pressure bombing operation.

A source of detector fluid, fluid source 14, is also coupled to the cell 10. It is coupled through a valve 15, a line 16, a valve 17, and a line 18 for use in backfilling the cell after a period of evacuation. A detector fluid is used that has a vapor state with a distinctive physical characteristic detectable by known instrumentation such as an infrared or ultraviolet spectrometer, a thermal conductivity detector, a photo ionization detector, or an electron capture detector, "known instrumentation" as used herein being intended to exclude weight measurement or bubble observation.

A pressure source 19 is coupled to the cell 10 through the line 18, the valve 17, the line 16, a line 100, a valve 20, and a line 101 for use in holding the detector fluid under pressure in an attempt to introduce liquid detector fluid into the cavity within the package 25 through any leaks that may exist.

A vacuum pressure gauge 21 is coupled through a valve 22 and a line 23 to the cell 10 for use in monitoring conditions within the cell, and a valve 24 is provided for venting the cell through a vent 29.

Figures 4, 5:
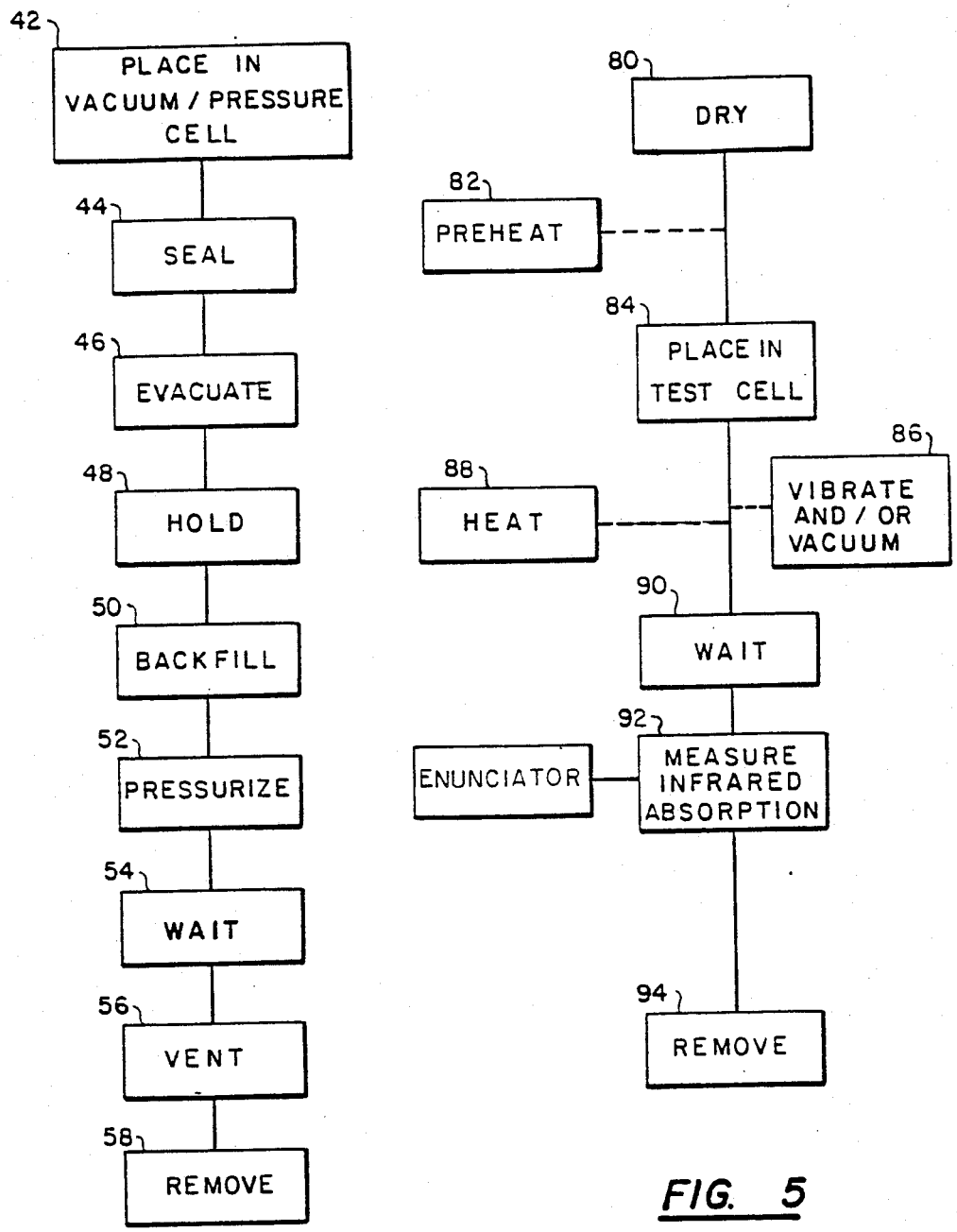
FIG. 4 is a flow diagram of a pressure bombing operation.
FIG. 5 is a flow diagram of the method for detecting evolving detector-fluid vapors according to the invention.

The pressure bombing proceeds using apparatus as illustrated in FIG. 1 according to the flow diagram of FIG. 4. An electronic package to be tested is placed in cell the 10, as illustrated by step 42 in FIG. 4, and the cell 10 is sealed (step 44), with the valve 17 and the valve 24 closed and with the valve 22 open to monitor pressure within the cell 10.

The cell 10 is then evacuated (step 46) and held in this condition for a period of time to allow evacuation of the cavity within the electronic package if any leaks exist. The valve 12 is opened and the vacuum pump 11 operated for this purpose. Evacuation to 5 torr held for approximately one hour has worked satisfactorily.

The cell 10 is next backfilled and pressurized for a period of time (steps 50-54). With the valve 20 and the valve 12 closed, the valve 17 and the valve 15 are opened to backfill the cell. Then, with the valve 15 and the valve 12 closed and the valve 17 still open, the valve 20 is opened to pressurize the cell to attempt to introduce liquid detector fluid into the cavity through any existing leaks. A pressure source containing nitrogen gas for pressurization to 70-100 PSIG for one half hour has been found satisfactory. For packages that cannot withstand much pressure, lower pressure and longer wait time would suffice.

At this point, some liquid detector fluid from the fluid source 14 in FIG. 1, will have been introduced into the cavity, through any gross leaks in the package 25.

The cell 10 is then vented by opening the valve 24 with valve 12 and the valve 17 closed, and the package 25 is removed (steps 56 and 58) for detection of any detector fluid outgassing.

METHOD 1014.5 of MIL-STN-883c, dated Aug. 25, 1983, exemplifies recognized military test specifications employing pressure bombing of the type described. Those specifications define test conditions which may be included in the method of this invention.

According to those specifications, a device to be tested shall be placed in a vacuum/pressure chamber and the pressure reduced to 5 torr and maintained for one hour, except that for devices with an internal volume $\geq 1$ cm$^3$, this vacuum cycle may be omitted. A sufficient amount of FC-72 or equivalent detector fluid shall be admitted to cover the devices. When the vacuum cycle is performed, the fluid will be admitted after the one-hour period but before breaking the vacuum.

The devices shall then be pressurized per a "fixed method" or a "flexible method". By the fixed method, devices with an internal cavity less than 0.1 cm$^3$ shall be pressurized at 60 psig for a duration of two hours minimum, and devices with an internal cavity volume equal to or greater than 1 cm$^3$ may be subjected to 30 psig (45 if the vacuum cycle was omitted) for ten hours if they cannot withstand the 60 psig, two hour condition. By the flexible method, devices shall be pressurized at 30, 60 or 90 psig for a minimum time (never less than one $F_t$) determined by:

$$T_p = \frac{0.1 \; VF_t}{6 \times 10^{-4} \, cm^3}$$

Where:
$T_p$ = Time of pressurization in minutes
V = Internal volume of device under test
$F_t$ = Filling time (from the following table)

TABLE

| Pressure | $F_t$ Minutes |
|---|---|
| 30 | 45 |
| 60 | 15 |
| 90 | 10 |

When the pressurization period is complete, the pressure shall be released and the devices removed from the chamber without being removed from a bath of detector fluid for greater than 20 seconds. A holding bath such as another vessel or storage tank may be employed.

METHOD 1014.5 goes on to specify bubble method detection conditions. When the devices are removed from the baths they shall be dried for $2 \pm 1$ minutes in air prior to immersion in FC-40 or equivalent indicator fluid, which shall be maintained at 125 degrees Celsius $\pm 5$ degrees Celsius. The devices shall be immersed with the uppermost portion at a minimum depth of 2 inches below the surface of the indicator fluid, one at a time or in such a configuration that a single bubble from a single device out of a group under observation may be clearly observed as to its occurrence and source. The device shall be observed against a dull, non-reflective black background through the magnifier, while illuminated by the lighting source, from the instant of immersion until expiration of a 30-second minimum observation period, unless rejected earlier. A definite stream of bubbles or two or more large bubbles originating from the same point shall be cause for rejection.

The prior art bubble method of detecting outgassing, such as specified in METHOD 1014.5, is illustrated in FIG. 2. The package 25 is immersed in an inert fluorocarbon indicator fluid such as that manufactured by 3M Company under the trademark FC-40, with an operator watching for a bubble to rise from the package as indicative of a leak. An indicator fluid, fluid 26, is depicted in FIG. 2 by horizontal broken lines. It is elevated in temperature to accelerate outgassing of detector-fluid vapor, as depicted by bubbles 28 rising from a cavity 27 within the package 25.

Turning now to FIG. 3, there is shown an exemplary embodiment of a system for detecting evolving detector-fluid vapor according to the method of this invention. It is referred to generally by reference numeral 30, and shown to include a test cell 31 with which to confine evolving detector-fluid vapor, and an infrared spectrometer 32 with which to measure the infrared absorption of the contents of the test cell 31.

The volume of the test cell 31 is proportioned to the size of the cavity within the package to be tested to inhibit dilution of any evolving detector fluid vapor beyond the detection capability of the spectrometer.

The embodiment illustrated in FIG. 3 employs a brass funnel 33 atop a hot plate 34. The brass funnel 33 is coupled to infrared the spectrometer 32 through a line 35 and a valve 36, with the combined volume of the brass funnel 33 and the line 35 being proportioned relative to the cavity size, the illustrated embodiment having a combined volume of approximately 750 ml for cavities on the order of 0.1 cm$^3$.

FIG. 3 also illustrates gas cell 37. Vapor confined with the test cell 31 may be transported to the gas cell 37 for measurement of infrared absorption by opening a valve 40 and operating a suction pump 39 which is coupled to the gas cell 37 through the valve 40 and a line 41.

The spectrometer may be a conventional instrument such as a Hewlett Packard 8450A spectrometer or a Perkin Elmer 180 spectrometer, the capabilities of which exceed that required for the amount of dilution permitted by the illustrated test cell.

An enunciator 38 shown in FIG. 3 as coupled to the infrared spectrometer 32 may be a device such as a strip chart recorder or a go/no-go device to automatically indicate non-detection or detection of detector-fluid vapor.

The hermeticity testing method of this invention proceeds using apparatus as illustrated in FIG. 3 according to the flow diagram of FIG. 5. After pressure bombing according to the steps illustrated in the flow diagram of FIG. 4, the package being tested is monitored for outgassing of detector-fluid vapor using known instrumentation to detect the distinctive physical characteristic of the fluid employed. This procedure is illustrated in general by step 92 in FIG. 5, with steps 80-90 illustrating procedures that may be included.

Acordingly, the package may first be dried (step 80) by allowing any detector fluid on the exterior of the package to evaporate.

Preheating (step 82) may be employed to accelerate drying of the exterior of the package as well as to accelerate outgassing of a quantity of any detector fluid within the cavity.

In using the apparatus illustrated in FIG. 3, the package may then be placed into the test cell 31 to confine any evolving detector fluid vapor (step 84). The package may be heated and/or vibrated at this time to further accelerate outgassing (steps 86 and 88). Also, a mild vacuum may be used to withdraw detector-fluid vapor from the cavity.

As illustrated by step 90, a period of time is then allowed to pass to permit outgassing, and the package is monitored to detect any outgassing (step 92).

Finally the package may be removed to make the test cell available for another manufacturing step (step 94). The test cell may be purged at this time or when another package is ready.

Thus, by this invention liquid detector fluid is introduced into a cavity through existing leaks, evacuation and pressure bombing serving to force the liquid in. The detector fluid is then forced back out for detection, pressure developed through vaporization serving to induce the desired outgassing. By using an appropriate detector fluid, detector-fluid vapor is detected with readily available instrumentation to provide more rapid, effective testing.

The usefulness and practicality of the system and method for detecting evolving detector fluid vapor were demonstrated in feasibility studies undertaken during development of the invention. Several readily available inert fluorocarbon detector fluids were examined. These fluorocarbons, commonly referred to by the trademark "FLUORINERTS", are manufactured by the 3M Company under the trademarks FC-40, FC-72 and FC-84. They are safe, basically inert, non-corrosive, and composed of fluorine and carbon. They exhibit boiling points of approximately 160 degrees Celsius, 56 degrees Celsius, and 80 degrees Celsius, respectively, and they may be mixed in different proportions to obtain varying characteristics. They each have a vapor state with recognizable infrared absorption characteristics for use in detecting outgassing through known means of measuring infrared absorption.

One of the feasibility studies in which those FLUORINERTS were examined showed that these FLUORINERTS all have vapor states with very strong infrared absorption suitable for detection with a simple infrared spectrometer. As little as 1 mg of liquid was easily detected, which is a small fraction of the liquid which can be introduced into the void volume of a dual in-line package.

There appears to be no obstacle to constructing an instrument capable of testing many hundreds of packages per hour. No close observation or judgment by an operator is needed. The use of FC-84 as the indicator fluid may be preferred, although both FC-84 and FC-72 work well. The former is less susceptible to fluctuations in ambient conditions because of its lower vapor pressure and higher boiling point, and additions to METHOD 1014.5 that specify FC-84 as an acceptable detector fluid have been approved.

Thus, with the method and system of this invention, the hermeticity of a sealed cavity within a microelectronic, semiconductor, or other electronic package may be more easily and effectively tested.

As various changes may be made in the form, construction, and arrangement of the procedures and parts described herein, without departing from the spirit and scope of the invention and without sacrificing any of its advantages, it is to be understood that all matter herein is to be interpreted as illustrative and not in any limiting sense.

What is claimed is:

1. A method for testing the hermeticity of a sealed cavity within an electronic package for gross leaks, said method comprising the steps of:
    (a) pressure bombing the package in a detector liquid bath using a detector liquid having a vapor state with recognizable infrared absorption characteristics, attempting thereby to introduce a quantity of detector liquid into the cavity;

(b) removing the package from the detector liquid bath to permit a quantity of any detector liquid within the cavity to vaporize and evolve from the cavity as an indication of a leak; and (c) detecting evolving detector vapor by measuring the infrared absorption of the vapor.

2. The method recited in claim 1 wherein said detector liquid is an inert fluorocarbon.

3. The method recited in claim 1 wherein said detector liquid has a boiling point below 58 degrees Celsius.

4. The method recited in claim 1 wherein said detector liquid has a boiling point below 83 degrees Celsius.

5. The method recited in claim 1 and further comprising the step of heating the package to accelerate vaporization of detector liquid introduced into the cavity during the pressure bombing step.

6. The method recited in claim 1 and further comprising the step of vibrating the package to accelerate detector vapor outgassing.

7. The method recited in claim 1 and further comprising the step of partially evacuating a test cell in which the package is contained in order to accelerate detector vapor outgassing.

8. The method recited in claim 1 and further comprising the step of drying the exterior of the package after the pressure bombing step.

9. The method recited in claim 1 and further comprising the step of confining evolving detector vapor within a test cell.

10. A gross leak test system for detecting fluorocarbon detector-liquid vapor evolving from a sealed cavity within a microcircuit electronic package, said system comprising:

(a) a test cell with which to confine any detector-liquid vapor evolving from the cavity and (b) measuring means for measuring the infrared absorption of the contents of the test cell to thereby detect any such vapor.

11. The system recited in claim 10 wherein said test cell has a volume proportioned to the size of the cavity to inhibit dilution of any evolving detector-liquid vapor beyond the detection capabilities of said measuring means.

12. The system recited in claim 10 wherein the ratio of the volume of said test cell to the volume of the cavity is less than $10^6$.

13. The system recited in claim 10 wherein said measuring means includes an infrared spectrometer.

14. The system recited in claim 10 and further including means for heating the package to accelerate vaporization of any detector liquid within the cavity.

15. The system recited in claim 10 and further including means for withdrawing detector-liquid vapor under vacuum.

* * * * *